(12) United States Patent
Ganghofer

(10) Patent No.: US 7,009,167 B2
(45) Date of Patent: Mar. 7, 2006

(54) METHOD OF ADJUSTING AN OPTRONIC FUSE SYSTEM

(75) Inventor: Andreas Ganghofer, Nuremberg (DE)

(73) Assignee: Diehl Munitionssysteme GmbH, Röthenbach (DE)

( * ) Notice: Subject to any disclaimer, the term of this patent is extended or adjusted under 35 U.S.C. 154(b) by 168 days.

(21) Appl. No.: 10/696,086

(22) Filed: Oct. 28, 2003

(65) Prior Publication Data

US 2004/0094693 A1    May 20, 2004

Related U.S. Application Data

(63) Continuation-in-part of application No. 09/864,992, filed on May 24, 2001, now abandoned.

(30) Foreign Application Priority Data

May 25, 2000   (DE)  .............................. 100 25 962

(51) Int. Cl.
    *H01J 40/14*   (2006.01)
(52) U.S. Cl. .............................. 250/214 R; 250/214 C; 102/213
(58) Field of Classification Search ............ 250/214 R, 250/214 AG; 102/211, 213; 356/5.01, 73.1
See application file for complete search history.

(56) References Cited

U.S. PATENT DOCUMENTS

| 4,153,835 | A | * | 5/1979 | Lau et al. ............... 250/214 C |
| 4,274,736 | A | | 6/1981 | Balmer |
| 5,638,163 | A | * | 6/1997 | Nourrcier, Jr. ............. 356/5.01 |
| 5,691,808 | A | | 11/1997 | Nourrcier, Jr. et al. |
| 5,696,657 | A | | 12/1997 | Nourrcier, Jr. et al. |
| 5,929,982 | A | * | 7/1999 | Anderson ................... 356/73.1 |

FOREIGN PATENT DOCUMENTS

| DE | 27 14 766 C3 | | 10/1978 |
| DE | 24 56 162 C2 | | 2/1981 |
| DE | 26 08 066 C2 | | 3/1981 |
| DE | 39 18 243 C2 | | 12/1990 |
| DE | 39 27 819 C2 | | 3/1991 |
| GB | 2394269 A | * | 4/2004 |
| WO | WO 98/18019 | | 4/1998 |

* cited by examiner

*Primary Examiner*—David Porta
*Assistant Examiner*—Suezu Ellis
(74) *Attorney, Agent, or Firm*—Scully, Scott, Murphy & Presser

(57) ABSTRACT

A method of adjusting the sensitivity of stabilizing an optronic fuse system, which includes a controller, and, as a receiver, an avalanche photodiode (APD). In order to avoid adjustment of an analog electronic system with potentiometers, laser trimming or individual resistor fitment, the controller ascertains the temperature of the APD in such a way that the sensitivity of the APD corresponds to its reference sensitivity at any temperature.

4 Claims, 1 Drawing Sheet

METHOD OF ADJUSTING AN OPTRONIC FUSE SYSTEM

CROSS REFERENCE TO RELATED APPLICATIONS

Figure 1:
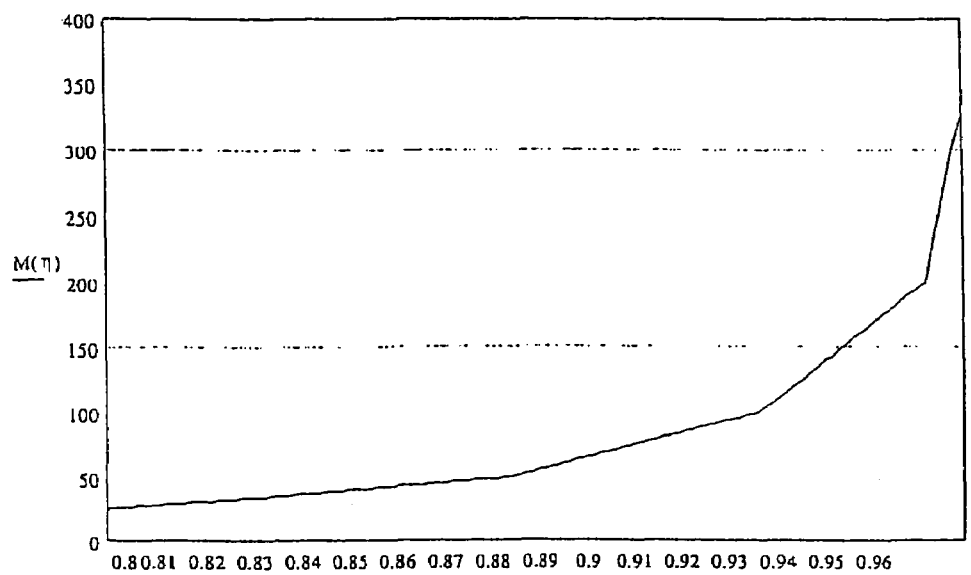

This application is a continuation-in-part of application Ser. No. 09/864,992, filed on May 24, 2001 now Abandoned.

BACKGROUND OF THE INVENTION

1. Field of the Invention

The present invention relates to a method of adjusting the sensitivity of and stabilizing an optronic fuse system, which possesses a controller and an avalanche photodiode (APD) constituting a receiver.

2. Discussion of the Prior Art

Optronic fuse systems are known per se in various configurations. For example, German Patent No. DE 24 56 162 C2 discloses a missile fuse with an opto-electronic measuring device, which, upon reaching a given range between the missile and a target surface, delivers a signal to an evaluation circuit. That known measuring device has a transmitter which emits optical pulses at a pulse repetition frequency through a lens and a receiver which is arranged at a given spacing from the transmitter and which records portions of those optical pulses, which are returned from the target surface by way of a further lens, with a narrow-band-pass filter which is tuned to the pulse repetition frequency, and a receiving amplifier. In order to eliminate the effects of circuitry-induced frequency deviations, connected between the band-pass filter and the transmitter is a regulating circuit by means of which the pulse repetition frequency of the transmitter tracks the center frequency of the band pass filter. The input signal of the regulating circuit is a signal, which is filtered out of the noise level of the receiving amplifier by the band pass filter.

An optical range sensor for a missile fuse is described in German Patent No. DE 26 08 066 C2, which operates on the basis of the pulse reflection principle and which in the reception branch thereof has in series connection of an amplifier, a gate circuit, which is opened in the transmission pulse cycle, an integrating capacitor circuit and a threshold switch. Arranged in the reception branch of that optical range sensor, upstream of the gate circuit, is a high-pass filter whose limit frequency is slightly below the transmission pulse repetition frequency. The integrating capacitor circuit is connected in such a way that it sums positive and negative signal components in accordance with the sign thereof.

An adjusting device located on opto-electronic proximity fuses is known from the disclosure of German Patent No. DE 27 14 766 C2 wherein, arranged in mutually juxtaposed relationship in the head of the fuse, are the optical systems of a transmitter provided with a directional antenna or emission device of a small area, and a light receiver is provided with a radiation detector which is also of a small area in size, whose light characteristics which are afforded by optical lenses can be adjusted in such a way that the beams thereof cross at a reference or target distance from the fuse head. In that case, the beam transmitter and the beam receiver are each arranged on a respective slider, which is disposed so as to be transversely displaceable on a disc-shaped carrier plate. The two carrier plates for the respective sliders are, in turn, supported in mounting bodies, which are each rotatable about the optical axis of the associated lens, which extends through the associated carrier plate and can be arrested after adjustment has been effected.

German Patent No. DE 39 18 243 C2 discloses an optronic proximity fuse, which responds to a reflection amplitude being exceeded and which has an adjustable mechanical aperture member in its beam path, which is to be reflected at a target surface, comprising transmission and reception characteristics. The aperture member is designed for triggering a fine threshold adjustment or calibration after coarse adjustment of the transmitter and the receiver, and is in the form of a pin-shaped shading element, which engages transversely with respect to the beam path to a greater or lesser depth into one of the characteristics. Moreover, an optronic fuse, which is designed in particular for a large-caliber aerial bomb is described in German Patent No. 39 27 819 C2.

Furthermore, Lau, et al., U.S. Pat. No. 4,153,835, describes an analog circuit, which facilitates a precise following of an operating voltage to a temperature dependent breakdown voltage within a temperature range of 0° C. through 50° C. This, in effect, pertains to a temperature compensation circuit, which in no manner can be employed to implement the inventive method of adjusting an optronic fuse system.

Nourrcier, Jr., U.S. Pat. No. 5,638,163, similar to the Lau, et al. patent, merely describes the implementation in a regulation of the operating voltage. However, the goal described in that particular publication is always to be able to set the best s/n ratio (signal to noise ratio) that is achieved, and wherein the operating voltage is increased for so long until the noise leads to sporadic distance measurements (the transmitter is not activated). In effect, the setting or adjustment criteria is the CFAR threshold, for example, the measurement of five erroneous measurements per second or the like. This has nothing in common with the present invention.

The object of the present invention is to provide a method of the kind set forth in the opening part of this specification, in which manual adjustment or calibration is eliminated so that the optronic fuse system, that is to say the optronic proximity fuse, is possible with a design which is appropriate for the demands of manufacturing

SUMMARY OF THE INVENTION

According to the invention, pursuant to the method as described herein, the controller ascertains the temperature of the avalanche photodiode (APD), and regulates the bias voltage of the APD in a manner whereby the sensitivity of the fuse system corresponds to the reference sensitivity thereof at any temperature.

Optronic fuses, which have to comply with a narrow sensitivity range hitherto, suffer from the problem that they have to be manually adjusted and calibrated. That adjustment operation is effected, for example, by setting potentiometers, which are provided for that purpose or by laser trimming, in particular in large-scale mass production or by individual resistor fitment, in particular in small-scale series production.

The overall sensitivity of the optronic fuse system is determined by the output of the transmitter and the level of sensitivity of the receiver and by the gain of the amplifier chain of the system. If the firing system is to have a narrow reference sensitivity, then that overall sensitivity limit is not to be exceeded by any transmitter-receiver-amplifier combination. The consequence of this is that the individual components must each involve a correspondingly close tolerance and that such a close tolerance is also necessary for the circuitry thereof. If in an optronic fuse system an avalanche photodiode (APD) is used as the receiver, the gain of the avalanche effect can be only very inaccurately set, which means that adjustment becomes still more important. Hitherto, laser-trimmable thick-film resistors were usually employed for that adjustment procedure, if the situation involves large-scale mass production of the optronic fuse system, as has been mentioned above. In the case of small-scale series production, the usual procedure adopted involves individual fitment with the appropriate resistors, as has also already been referred to above. Irrespective of whether the situation involves small-scale series production or large-scale series production, hitherto a so-called closed loop operation must be used for adjustment purposes, that is to say the entire fuse system or the entire sensor has to be fitted and set in operation in order to be able to implement the adjustment procedure. Consequently, adjustment can only be implemented at a very late stage in the assembly or manufacturing chain. That means that protective coatings can be only partially applied to the components to be adjusted or that the protective coatings have to be applied manually after the adjustment procedure has been carried out. Manual fitment, the operation of applying the protective sheathings and the necessary quality assurance procedures mean that relatively high manufacturing costs are incurred with such known optronic fuse systems. In addition the electromechanical design is limited because the components to be adjusted must be accessible for adjustment purposes in the installed condition.

Those shortcomings are advantageously eliminated by means of the method according to the invention. In the case of optronic fuse systems according to the invention, which are already equipped with a controller, preferably with a flash memory, discrete regulation of the bias voltage of the APD by way of a temperature compensation network is replaced by regulation by way of said controller. In that situation, the controller ascertains the temperature of the APD and specifically regulates the bias voltage thereof in such a way that the sensitivity corresponds to the reference sensitivity, at any temperature. That regulation can advantageously also be used for trimming sensitivity. In that case, in the trimming procedure, the individual bias voltage of the APD is ascertained in such a way that the sensitivity of the sensor corresponds to the reference sensitivity. In operation of the fuse system, starting from the working point of the temperature curve, which corresponds to normal sensitivity, temperature compensation can then be effected again. In that case, in the adjustment procedure, the controller is desirably loaded with a basic operating software which sets the APD to a medium gain factor.

To carry out the method according to the invention, the optronic fuse system is set in operation in the adjustment procedure and the signal levels achieved, that is to say the sensitivity, are measured. The gain, which is a function of the bias voltage of the APD, can be calculated from the respectively measured value. The controller can then be programmed with the bias voltage.

Pursuant to the inventive method, the sensitivity of the sensor during the final calibration in the manufacture is carried out a single period of time. The increase or the reduction in the sensitivity is achieved in that the working point of the APD is correspondingly selected inasmuch as the specific application of the APD depends upon the ratio of the operating voltage to the breakdown voltage of the APD, and thus, there can be adjusted the sensitivity of the system through the ratio of the voltages.

It can be ascertained from the foregoing that an analog adjustment procedure as has hitherto been implemented is advantageously no longer required. A further advantage is that any ageing of the sensor arrangement can also be compensated for at any time by a re-programming procedure.

BRIEF DESCRIPTION OF THE ACCOMPANYING DRAWINGS

Drawing FIGS. 1 and 2, which are described hereinafter, serve to further elucidate the concept of the invention; wherein FIG. 1 graphically shows the functional relationship between the ratio η between the bias voltage to the breakdown voltage and the APD-gain M(η); and FIG. 2 graphically shows the functional relationship between the temperature (T) and the bias voltage $U_B(T)$.

DETAILED DESCRIPTION OF THE PREFERRED EMBODIMENTS

As shown in FIG. 1, the inherent gain (avalanche effect) of the APD is to be set by way of the ratio η of the bias voltage to the breakdown voltage. If the reception system is too insensitive, the ratio η has to be increased in a trimming operation. If conversely the reception system is too sensitive, the ratio η has to be reduced in the trimming operation.

Figure 2:
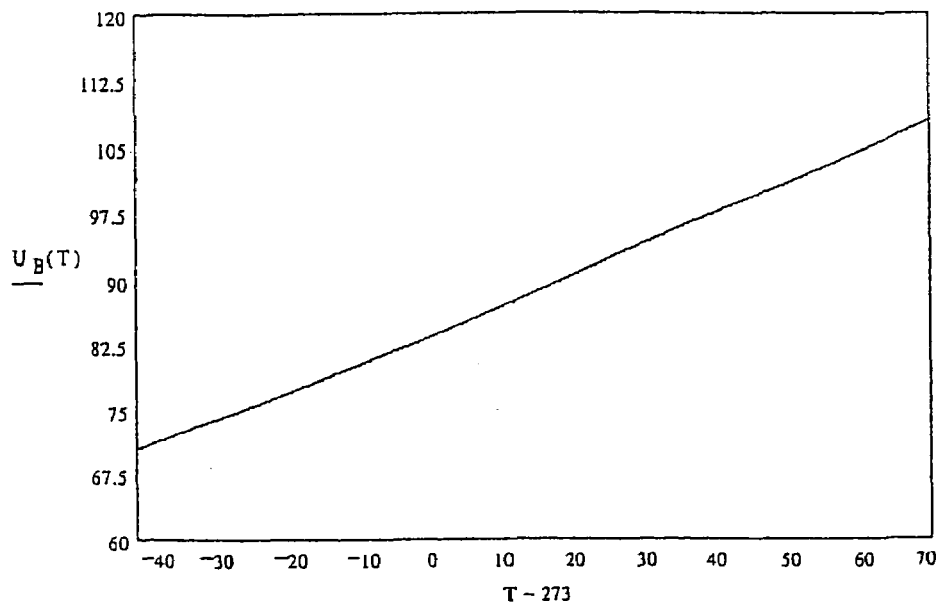

Since, as can be seen from FIG. 2, the breakdown voltage $U_B$ is heavily dependent on the temperature (T-273), the ratio η (see FIG. 1) must be correspondingly re-adjusted upon a change in temperature.

The foregoing sensitivity of the sensor is achieved, by way of example, as described hereinabove, in that this signifies should the system normally be operated at a ratio of the two voltages, in essence, the operating voltage relative to the breakdown voltage of, for example, 93%, then for sensitive sensors, the ratio must be reduced, for example, to about 91%, whereas for insensitive sensors, the ratio is to be increased, for example, to 94.5%. Accordingly, during the calibration carried out in the manufacture of the respective sensor, there is only searched for the fitting percentage value, and which is then programmed into the sensor. However, inasmuch as the breakdown voltage of the APD is extremely temperature dependent, then the sensor must have the temperature determined prior to a measuring cycle. On the basis of the determined temperature, then through a suitable computation or formula, there can be found the applicable or valid breakdown voltage. By means of this breakdown voltage, as a temperature in f (° C.), the sensor can set the known percentage value of the calibration. In the event that this percentage value is correct, then also the sensitivity will be correct. The importance of maintaining the sensitivity constant through a range of temperature is necessary in that the trigger for the optronic fuse can then process with the required timely precision only a definite input voltage range. The receiving signal must maintain this input voltage range over a temperature range. Thus, in the event that the operating voltage does not follow over a temperature range, then the required percentage value would not be maintained, and the signals at lower temperatures would become extremely high and would be extremely low at a higher temperature.

Pursuant to the present invention, the operating voltage is provided in a software technological mode, meaning the temperature is measured, the value is introduced in the form of a formula for the temperature cycle into the APD and the result is multiplied with the desired percentage value, whereby there is directly obtained is the operating voltage which is to be set. The foregoing method is not in any manner known in the present technology, inasmuch as the present system is designed for short distances and within this time range shortly subsequent to the stimulation of the pulse laser, the system is not noise limited, but is disruption limited, such that the present sensor is operated far distant from the noise threshold. In essence, pursuant to the present invention, the sensor stores in a single time, generally during its manufacture, a desired operating ratio of the APD (percent value), which is carried along over a temperature range, whereby the temperature is determined by means of a temperature sensor. The $\mu c$ computes with this temperature a new operating voltage, which is adapted to maintain the desired percentage value desired for this temperature. In order to be able to accomplish this, the sensor must, during manufacture, be programmed with the APD specific breakdown voltage, as well as also with the desired percentage value.

The foregoing, thus provides a simple and novel method for adjusting an optronic fuse system, which is not at all known in the current technology.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A method of adjusting the sensitivity of an optronic fuse system which comprises a transmitter, a receiver, an amplifier chain, and a sensor connected ahead of the receiver and of the amplifier chain; comprising a calibration cycle, with the steps of:
   (a) measuring a signal level during operation of the system;
   (b) adjusting the sensitivity of the optronic fuse system by setting only the sensitivity of the sensor;
   (c) storing a gain factor which is dependent upon said measured signal level into a controller for setting the sensitivity of said sensor, said sensor comprising an avalanche-photodiode (APD), said avalanche-photodiode having a bias voltage which is set by the controller; and
   (d) implementing a temperature compensation during the operation of the optronic fuse system commencing from a working point in a temperature curve for the avalanche-photodiode which corresponds to a specified reference sensitivity.

2. A method according to claim 1, wherein the adjusting of the optronic fuse system is obtained for the measured signal level from which there is derived a temperature compensation.

3. A method according to claim 1, wherein said bias voltage is set in dependence upon temperature.

4. A method according to claim 1, wherein said controller is loaded with an operating software system for the purpose of adjusting the optronic fuse system, through which said avalanche-photodiode is set to the gain factor.

* * * * *